Figure 1:
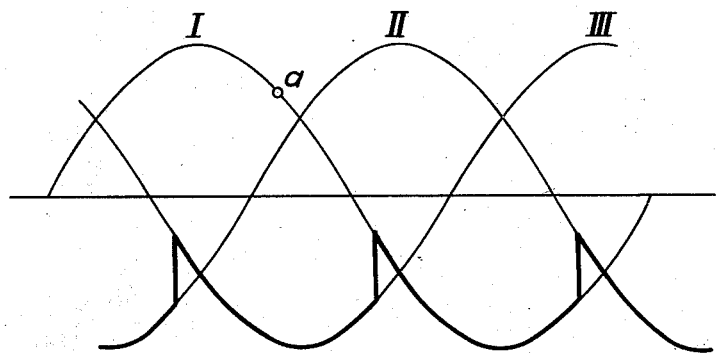

Dec. 12, 1950

U. LAMM 2,534,036

METHOD OF PUTTING INVERTERS
OUT OF AND INTO FUNCTION
Filed May 13, 1947

Inventor
UNO LAMM
By
Attorney.

Patented Dec. 12, 1950

2,534,036

UNITED STATES PATENT OFFICE 2,534,036

METHOD OF PUTTING INVERTERS OUT OF AND INTO FUNCTION

Uno Lamm, Ludvika, Sweden, assignor to Allmänna Svenska Elektriska Aktiebolaget, Vasteras, Sweden, a corporation of Sweden Application May 13, 1947, Serial No. 747,801
In Sweden May 14, 1946

7 Claims. (Cl. 321—11)

Contrary to rectifiers with ignition control which, as a rule, can be put out of function very rapidly by preventing an ignition, for instance by a negative grid voltage or by omitting an impulse to an instantaneous ignitor, it is very difficult to put inverters very rapidly out of function. An omitted ignition in inverters causes instead a more or less serious disturbance, which must be cured by special means, among which is a reduction of the feeding direct current voltage.

It is known to use in static current converters in general a bypass valve connected in parallel to the converter and entering into function for instance at a disturbance, when it discharges the converter. The connection of such a bypass valve in circuit means, however, only a provisional step. In rectifiers it has been supplemented for instance by a blocking of the subsequent ignition, but in inverters no supplementary steps have been taken, but the provisional step has been regarded as sufficient, and as the case may be, the direct current voltage has been reduced.

According to the present invention, which refers to the operation of inverters, the known provisional putting out of function by connecting a bypass valve in circuit is supplemented by such steps inside the inverter as to make it deliver no current. Such a step is for instance a blocking of the ignition. While such a step, taken without any preparation, causes a disturbance instead of curing one, it has been surprisingly found that in connection with the releasing of a bypass valve it may well be employed and then puts the inverter definitely out of function.

Another step which is known per se, but which in combination with the releasing of the bypass valve can be effected much easier than otherwise, is a disconnection of the inverter from the alternating current network. Such a disconnection can, after the releasing of the bypass valve, normally be effected practically without interrupting any current. If, on the other hand, a serious disturbance has occurred, for instance serious fluctuations in the voltage of the alternating current network or damages in the control grid or grid control apparatus of the inverter, an appreciable current may flow through the inverter also after the releasing of the bypass valve. This latter step reduces, however, the current of the inverter and especially permits its blocking by a negative grid voltage, a step which is otherwise without effect in an inverter.

Still another step to be taken in combination with the function of the bypass valve is a retardation of the ignition of the inverter so far as to annihilate its current. This means that the voltage of the inverter may not even during a portion of a cycle be that of a rectifier.

The steps described are especially suitable in inverters, which are series-connected with similar ones for utilizing an especially high direct current voltage. In such case they should be applied individually to the separate inverters so that one or more of these may be put out of function, while the others operate normally.

The means may be employed not only for protection against disturbances, in which case they should generally be released automatically, but also when it is intended to put an inverter occasionally out of function without such a cause, for instance for inspection.

The restoring of the normal function of an inverter short-circuited by a bypass valve is preferably effected as will now be described with reference to Fig. 1 of the accompanying drawing. In this figure, I, II and III are the voltage curves of three phases in a three-phase converter. The parts of these curves shown in heavy lines represent the cycle parts, in which the respective phases carry current at a certain control angle for inversion. (The time for the commutation has been omitted.) The voltage of the active valve path then never rises above the zero line, which for instance in one-way converters means that the cathode is always negative with respect to the transformer neutral. If now the connection between these last-mentioned points is short-circuited by a bypass valve so as to impart equal potential thereto, the anodes will always have a negative potential with respect to the cathode and thus cannot ignite. For igniting an anode it is necessary that it is released, while its potential is still higher than that of the neutral, that is while the voltage curve (for instance the curve I) lies above the zero line. If thus it is released in the point $a$, and the bypass valve is blocked before the curve I intersects the zero line, the valve corresponding to I will carry the current and then commutate to the next main valve in the usual order etc. The condition for restoring normal operation can generally be said to be that the inverter voltage shall be reduced so far that a rectifier voltage is obtained at least during parts of cycles. The blocking of the bypass valve may take place before or after the ignition of the main valve but should be completed before the direct current voltage of the inverter passes through zero.

The steps for putting an inverter out of function according to the present invention should in most cases be combined with a current regulation or current limitation of the direct current source, for instance a rectifier plant, so that the total or partial short-circuiting of the inverter, as viewed from the direct current side, does not give rise to non-permissible currents.

Figure 2:
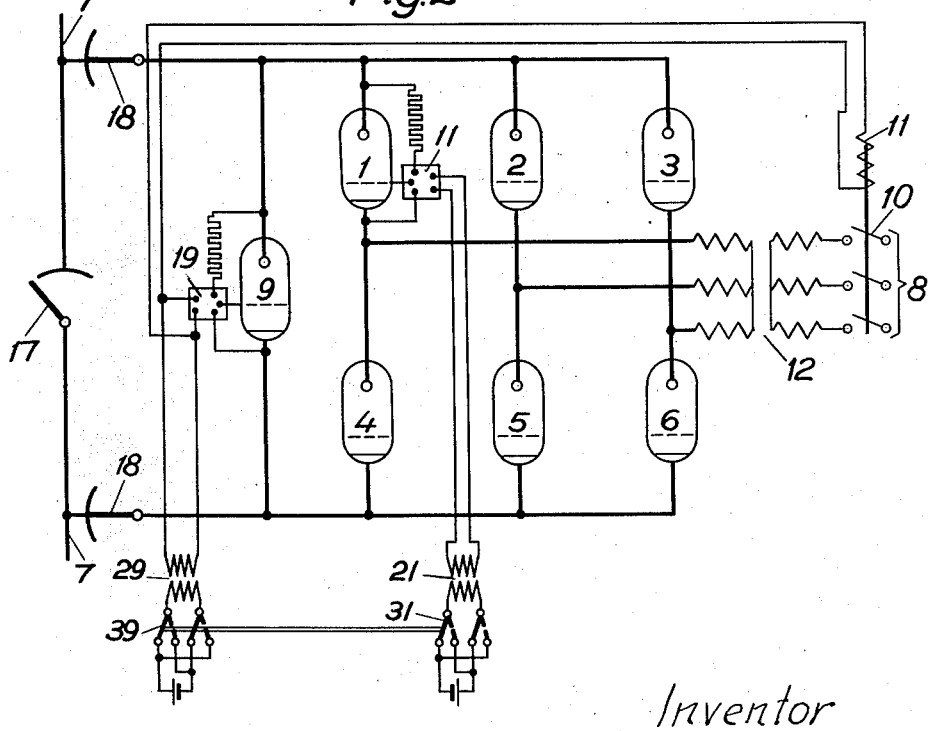

An example of a device for putting the inverter out of function according to the present invention is diagrammatically illustrated in Fig. 2 of the drawing. 1—6 are here six valves of a three-phase two-way inverter, the direct current terminals of which are designated by 7 and the alternating current terminals by 8. On the direct current side, the inverter may for instance be series-connected with similar ones, and on the alternating current side it may be connected to an alternating current net-work across a transformer. A bypass valve 9 is connected in parallel to the inverter on the direct current side.

For grid control of each of the valves there is a control apparatus, which for the sake of simplicity is only shown for the valves 1 and 9 and only diagrammatically at 11 and 19 respectively. It may for instance be so arranged in a manner known per se (the Swedish Patent 117,120) as to keep, after receiving an impulse in one direction, the corresponding grid at the positive or negative potential, until it receives an impulse in the opposite direction. Such impulses are sent across insulating transformers 21, 29 from reversing switches 31, 39, which for instance may be connected together in such manner that the grid of the valve 1 becomes negative at the same time as or immediately after the grid of the valve 9 has become positive or the grids of the main valves 1—6 may, in connection with the releasing of the valve 9, receive such impulses from the control apparatus as to retard the commutation of all the main valves so far as to annihilate their current, or a disconnecting switch 10 on the alternating current side may be released by a solenoid 11 in connection with the valve 9 so as to disconnect the inverter from the alternating current network. Such a disconnecting switch is preferably placed on the lower voltage side of a transformer 12 connected to the inverter.

As soon as the inverter has been put out of function in any of the ways now described, it is also advisable to disconnect it mechanically from the direct current terminals, for instance by a switch 18 after the direct current terminals and the bypass valve have been short-circuited by a switch 17.

As in the patent application Serial No. 735,920, some of the main valves of the inverter may according to the present invention serve as bypass valves. In this case two valves lying in series between the direct current terminals are released at the same time, which never occurs in normal operation.

I claim as my invention:

1. In the operation of an inverter for converting direct current into full-wave alternating current, the steps of releasing a bypass valve in parallel to the inverter so as to allow the passage of a continuous direct current in parallel to the inverter, and thereafter preventing the flow of current through the inverter.

2. In the operation of an inverter for converting direct current into full-wave alternating current, the steps of releasing a bypass valve in parallel to the inverter so as to allow the passage of a continuous direct current in parallel to the inverter, and thereafter preventing the flow of current through the inverter.

3. In the operation of an inverter for converting direct current into full-wave alternating current, the steps of releasing a bypass valve in parallel to the inverter so as to allow the passage of a continuous direct current in parallel to the inverter, and thereafter blocking the valve paths of the inverter to prevent the flow of current therethrough.

4. In the operation of an inverter for converting direct current into full-wave alternating current, the steps of releasing a bypass valve in parallel to the inverter so as to allow the passage of a continuous direct current in parallel to the inverter, and thereafter disconnecting the inverter on the alternating current side thereof.

5. In the operation of an inverter for converting direct current into full-wave alternating current, the steps of releasing a bypass valve in parallel to the inverter so as to allow the passage of a continuous direct current in parallel to the inverter, and thereafter retarding the commutation of the inverter sufficiently to prevent any substantial flow of current therethrough.

6. In the operation of an inverter, the steps of releasing a bypass valve in parallel to the inverter, thereafter abolishing the current in the inverter, then displacing the commutation of the inverter in an earlier sense so as to give a rectifier voltage during parts of cycles, and thereafter blocking said bypass valve.

7. An operation as claimed in claim 1 in which said inverter is in series with other inverters.

UNO LAMM.

REFERENCES CITED

The following references are of record in the file of this patent:

UNITED STATES PATENTS

| Number | Name | Date |
|---|---|---|
| 1,691,395 | Langmuir | Nov. 13, 1928 |
| 1,802,677 | Slepian | Apr. 28, 1931 |
| 1,954,028 | Stansbury | Apr. 10, 1934 |
| 2,119,865 | Lamm | June 7, 1938 |

FOREIGN PATENTS

| Number | Country | Date |
|---|---|---|
| 88,730 | Sweden | Mar. 9, 1937 |
| 90,345 | Sweden | Sept. 28, 1937 |
| 445,418 | Great Britain | Apr. 2, 1936 |
| 496,479 | Great Britain | Nov. 30, 1938 |